United States Patent
Lee et al.

(10) Patent No.: US 7,321,199 B2
(45) Date of Patent: Jan. 22, 2008

(54) DISPLAY APPARATUS AND CONTROL METHOD THEREOF

(75) Inventors: Sang-Hoon Lee, Ulsan (KR); Jeong-Il Kang, Yongin-si (KR); Yung-Jun Park, Yongin-si (KR); Kyoung-Geun Lee, Suwon-si (KR)

(73) Assignee: Samsung Electronic Co., Ltd., Suwon-Si (KR)

( * ) Notice: Subject to any disclaimer, the term of this patent is extended or adjusted under 35 U.S.C. 154(b) by 0 days.

(21) Appl. No.: 11/483,628

(22) Filed: Jul. 11, 2006

(65) Prior Publication Data

US 2007/0057638 A1  Mar. 15, 2007

(30) Foreign Application Priority Data

Sep. 12, 2005  (KR)  ............. 10-2005-0084611

(51) Int. Cl.
G05F 1/00  (2006.01)
(52) U.S. Cl. ............. 315/194; 315/224; 315/291; 345/82; 345/204
(58) Field of Classification Search ........... 315/209 R, 315/219, 291, 307–308, 194, 224, 246, 301, 315/312; 345/82, 84, 204, 212
See application file for complete search history.

(56) References Cited

U.S. PATENT DOCUMENTS

| | | | |
|---|---|---|---|
| 5,365,148 A * | 11/1994 | Mallon et al. ............. 315/194 |
| 6,621,235 B2 * | 9/2003 | Chang ............. 315/216 |
| 6,867,757 B1 * | 3/2005 | Nakamura ............. 345/83 |
| 6,979,957 B2 * | 12/2005 | Lee et al. ............. 315/195 |
| 2004/0090403 A1 * | 5/2004 | Huang ............. 345/82 |
| 2004/0196225 A1 | 10/2004 | Shimada ............. 345/82 |
| 2004/0263095 A1 * | 12/2004 | Min et al. ............. 315/291 |
| 2005/0168168 A1 * | 8/2005 | Elliott ............. 315/247 |
| 2006/0055687 A1 * | 3/2006 | Sheu et al. ............. 345/204 |
| 2006/0291512 A1 * | 12/2006 | Borschowa ............. 372/38.02 |

FOREIGN PATENT DOCUMENTS

| JP | 11-305198 | 11/1999 |
|---|---|---|
| JP | 2004-029141 | 1/2004 |

\* cited by examiner

*Primary Examiner*—Haissa Philogene
*Assistant Examiner*—Tung X Le
(74) *Attorney, Agent, or Firm*—Roylance, Abrams, Berdo & Goodman, L.L.P.

(57) ABSTRACT

A display apparatus and method in which a current ripple is decreased to improve characteristics of a display apparatus are provided. A display apparatus comprises a light source, a plurality of driving power units providing driving electric powers to the light source, and a controller controlling the plurality of the driving power units so that electric currents of the driving electric powers provided from the respective driving power units have a predetermined phase difference from each other.

10 Claims, 3 Drawing Sheets

DISPLAY APPARATUS AND CONTROL METHOD THEREOF

CROSS-REFERENCE TO RELATED APPLICATIONS

This application claims the benefit under 35 U.S.C. § 119(a) of Korean Patent Application No. 2005-0084611, filed in the Korean Intellectual Property Office on Sep. 12, 2005, the entire disclosure of which is hereby incorporated by reference.

BACKGROUND OF INVENTION

1. Field of Invention

The present invention relates to a display apparatus. More particularly, the present invention relates to a display apparatus in which an electric power is supplied to a light source unit by a switching method.

2. Description of the Related Art

A light emitting diode (LED) has been used as a light source in a display apparatus instead of a cold cathode fluorescent lamp (CCFL) to improve color reproducibility. The display apparatus using the LED is improved in the color reproducibility.

A conventional display apparatus comprising an LED light source controls the LED light source using either a linear method or a switching method.

In the linear method, the display apparatus comprises a constant voltage source for generating voltage to be provided to the LED light source, a switching unit for switching so that an electric current by the voltage from the constant voltage source flows to the LED light source, and a pulse width modulation (PWM) generator for turning on/off the switching unit. According to the linear method, noise and ripple is slight while the LED light source should be constantly supplied with a work current of a linear region. Therefore, when the LED light source has a high load of current, voltage loss generated in the switching unit grows high to continuously provide the work current of the linear region.

In the switching method, the display apparatus comprises a constant current source generating current to be provided to the LED light source, a switching unit for switching so that the current from the constant current source flows to the LED light source, and a PWM generator for turning on/off the switching unit. The work current flows to the LED light source in a PWM-on section to turn on the LED light source, and a "0" current flows to the LED light source in a PWM-off section to turn off the LED light source. Here, the switching unit is turned on/off according to the amount of the current flowing in the LED light source in the PWM-on section, the amount of the current flowing in the LED light source pulsates slightly and an average work current flows in the LED light source.

In the switching method, ripple is generated in a cycle corresponding to switching on/off while the current is provided to the LED light source, and accordingly a light characteristic of the LED light source is deteriorated. An inductor with high capacity may be used or a switching frequency may be raised to remove the ripple. However, the inductor with high capacity is not easily manufactured, and its characteristics deteriorates as its volume increases. Further, switching loss increases as the switching frequency is raised, thereby efficiency of the display apparatus is reduced.

Accordingly, there is a need for an improved system and method for providing a display apparatus in which a current ripple is decreased to improve characteristics of a display apparatus.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a display apparatus in which a current ripple decreases to improve characteristics of a display apparatus.

A display apparatus comprising a light source, a plurality of driving power units which provide driving electric powers to the light source and a controller which controls the plurality of the driving power units so that electric currents of the driving electric powers provided from the respective driving power units have a predetermined phase difference from each other.

According to an exemplary embodiment of the present invention, the power supply driving units each comprise switching units providing electric currents output from a predetermined constant current source to the light source; and PWM generators generating PWM signals to control on/off of the switching units.

According to an exemplary embodiment of the present invention, the controller controls the respective PWM generators so that each of the PWM signals are retarded at the predetermined phase difference.

According to an exemplary embodiment of the present invention, the controller outputs a synchronizing signal to the PWM generators so that the respective PWM signals have a predetermined phase difference.

According to an exemplary embodiment of the present invention, the phase difference is expressed as $1/f*N$ if the frequency of the PWM signal is f and the number of the driving power units is N.

According to an exemplary embodiment of the present invention, the light source is provided with an electric current by a switching method. The electric current is increasingly provided to the light source when the switching unit is on and the electric current is decreasingly provided to the light source when the switching unit is off.

According to an exemplary embodiment of the present invention, the PWM generator detects an electric current flowing in the light source and compares a detected electric current with a predetermined directive value, and controls whether the switching unit is on/off.

According to an exemplary embodiment of the present invention, the PWM generator generates the PWM signal to turn on the switching unit when the detected electric current is more than the predetermined directive value, and to turn off the switching unit when the detected electric current is less than the predetermined directive value.

According to an exemplary embodiment of the present invention, the light source comprises a light-emitting diode.

A control method of a display apparatus comprising a light source is provided. A plurality of driving power units are provided, PWM signals are generated to provide a constant electric current to the light source, and the PWM signals are sequentially retarded at a predetermined phase difference.

According to an exemplary embodiment of the present invention, retarding the PWM signals generates a synchronizing signal so that the PWM signals have the predetermined phase difference.

Other objects, advantages, and salient features of the invention will become apparent from the detailed description, which, taken in conjunction with the annexed drawings, discloses preferred embodiments of the invention.

BRIEF DESCRIPTION OF THE DRAWINGS

The above and other exemplary objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
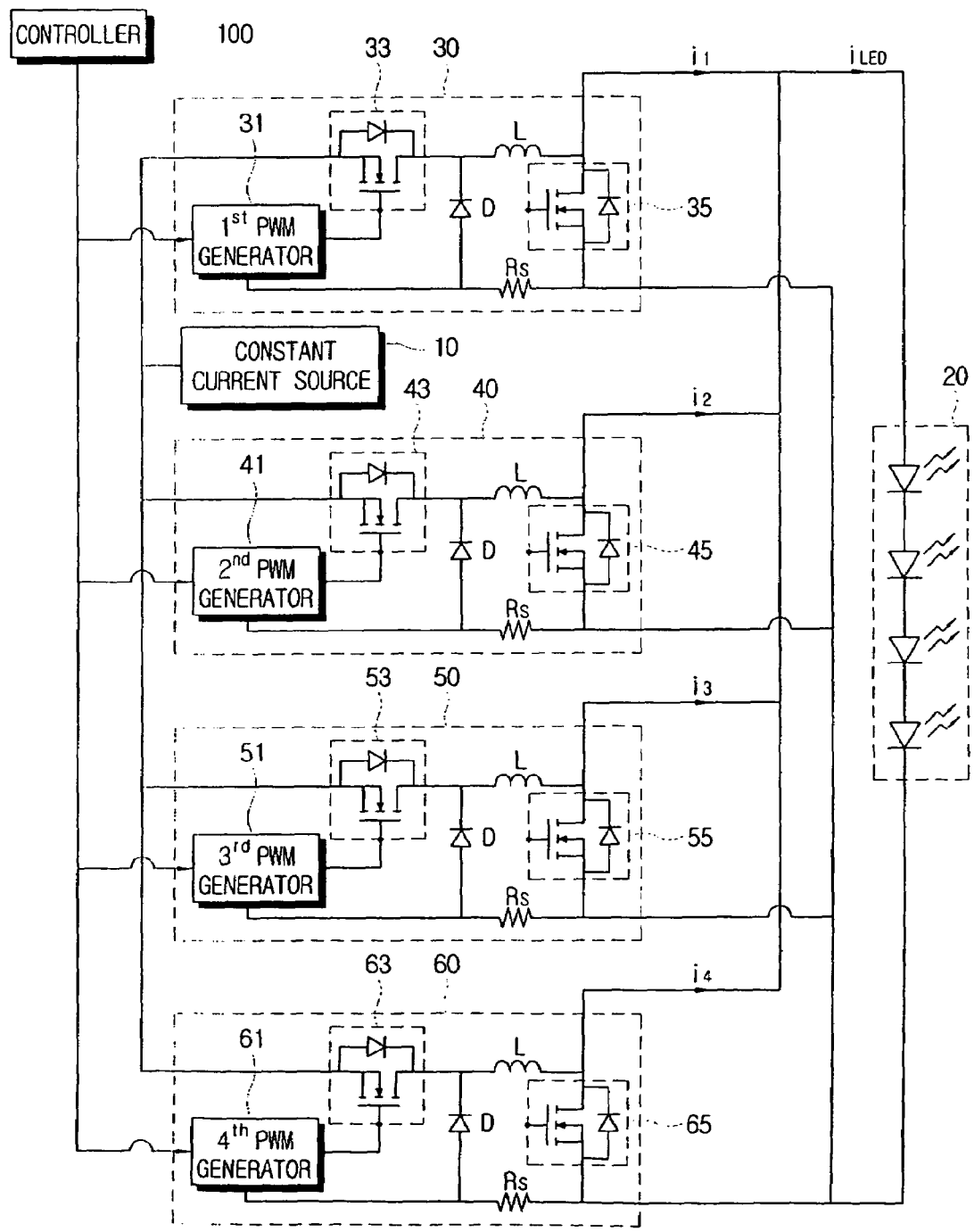
FIG. 1 is a control block diagram of a display apparatus in accordance with an exemplary embodiment of the present invention.

FIG. 1 is a control block diagram of a display apparatus in accordance with an exemplary embodiment of the present invention. As shown in FIG. 1, the display apparatus comprises a constant current source 10, an LED light source 20, a plurality of driving power units 30, 40, 50 and 60 and a controller 100 controlling the driving power units 30, 40, 50 and 60.

The constant current source 10 is a source of electric power which is provided to the LED light source 20 and generally provides a current electric power to the LED light source 20. The plurality of the driving power units 30, 40, 50 and 60 may be connected with the constant current source 10 in parallel and may each comprise an independent constant current source 10.

The LED light source 20 provides light to a display (not shown) to display an image. The LED light source 20 may comprise an LED as a light source. In general, the LED light source 20 comprises a plurality of LEDs.

The LED light source 20 comprises an R-LED emitting red light, a G-LED emitting green light and a B-LED emitting blue light. The LED light source 20 may further comprise various colors of LEDs such as a C-LED emitting cyan light, a Y-LED emitting yellow light, a W-LED emitting white light, among others.

The display apparatus, according to an exemplary embodiment of the present invention, operates in a driving method how each of the LEDs sequentially emits light. For example, when the display apparatus is a projection TV using a DLP and three LEDs, such as the R-LED, the G-LED and the B-LED, are used as a light source, each of the LEDs emits light sequentially. That is, the R-LED emits light first, and the R-LED is extinguished after a time period, and then the G-LED emits light. Subsequently, the G-LED is extinguished after a time period, and then the B-LED emits light.

The LED light source 20, according to an exemplary embodiment of the present invention, is provided with an electric current in a switching method, which increasingly provides the electric current when the first switching units 33, 43, 53 and 63 are on and decreasingly provides the electric current when they are off.

The driving power units 30, 40, 50 and 60 control the electric power provided from the constant current source 10 to supply a driving electric power to an electrode of the LED light source 20. The brightness of the LED light source 20 is adjusted according to the amount of the driving electric power supplied from the driving power units 30, 40, 50 and 60. The driving power units 30, 40, 50 and 60 compare a reference voltage output from the controller 100 with an output voltage in proportion to the electric current applied to the LED light source 20, thereby controlling the amount of the electric current applied to the LED light source 20. Also, each of the driving power units 30, 40, 50 and 60 outputs an electric current comprising a phase difference by control of the controller 100. Four driving power units 30, 40, 50 and 60 are provided in an exemplary embodiment of the present invention. However, the number of the driving power units 30, 40, 50 and 60 is not limited to four.

The driving power units 30, 40, 50 and 60 each comprise pulse width modulation (PWM) generators 31, 41, 51 and 61, first switching units 33, 43, 53 and 63 and second switching units 35, 45, 55 and 65. Also, the driving power units 30, 40, 50 and 60 comprise inductors L, current sensing resistors Rs and diodes D, respectively. The inductors L are each disposed between the first switching units 33, 43, 53 and 63 and the second switching units 35, 45, 55 and 65. The current sensing resistors Rs are each disposed between the PWM generators 31, 41, 51 and 61 and the second switching units 35, 45, 55 and 65. Anodes of the diodes D are each connected between the PWM generators 31, 41, 51 and 61 and the current sensing resistors Rs and cathodes are each connected between the first switching units 33, 43, 53 and 63 and the inductors L.

The first switching units 33, 43, 53 and 63 control a flow of the electric current which is provided to the LED light source 20 from the constant current source 10. Preferably, the first switching units 33, 43, 53 and 63 comprise a metal-oxide semiconductor field effect transistor (MOSFET) which may be on/off by PWM control of the PWM generators 31, 41, 51 and 61. The amount of the electric current applied to the LED light source 20 by turning on/off the first switching units 33, 43, 53 and 63 is adjusted to have a triangular waveform. The triangular waveform repeatedly increases and decreases, and thus an average value of the electric current determines the brightness of the LED light source 20.

The PWM generators 31, 41, 51 and 61 control the first switching units 33, 43, 53 and 63 in PWM so that the driving power units 30, 40, 50 and 60 output a constant current power which is capable of maintaining the brightness of the LED light source 20 to be a directive value. That is, the PWM generators 31, 41, 51 and 61 generate PWM signals to turn on/off the first switching units 33, 43, 53 and 63. In an exemplary implementation, the PWM signals generated from each of the PWM generators 31, 41, 51 and 61 have similar frequencies and amplitudes. The PWM signals are sequentially retarded by a phase difference by a synchronizing signal output from the controller 100.

The PWM generators 31, 41, 51 and 61 are input with a lighting control signal of the LED light source 20 of the directive value from the controller 100 when the display apparatus starts to be driven, thereby turning on the first switching units 33, 43, 53 and 63 maintaining the electric current. Then, the PWM generators 31, 41, 51 and 61 detect a comparative voltage applied through the current sensing resistors Rs and compare the detected comparative voltage with the directive value to control whether the first switching units 33, 43, 53 and 63 are on/off. That is, the PWM generators 31, 41, 51 and 61 turn on the first switching units 33, 43, 53 and 63 when the detected electric current is more than the directive value and turn off the first switching units 33, 43, 53 and 63 when the detected electric current is less than the directive value, repeatedly.

The PWM generators 31, 41, 51 and 61 are disabled by the controller 100 when the display apparatus is off, and thus the driving power units 30, 40, 50 and 60 do not output the driving electric power.

The second switching units 35, 45, 55 and 65 control the driving electric power output from the first switching units 33, 43, 53 and 63. The second switching units 35, 45, 55 and 65 are turned on/off according to a PWM control signal from the controller 100, thereby intercepting the driving electric power provided from the first switching units 33, 43, 53 and 63 to the LED light source 20. In an exemplary implementation, the second switching units 35, 45, 55 and 65 comprise a MOSFET.

In an exemplary implementation, when the second switching units 35, 45, 55 and 65 are off, the driving electric power output from the PWM generators 31, 41, 51 and 61 and passing through the first switching units 33, 43, 53 and 63 is applied to the LED light source 20. When the second switching units 35, 45, 55 and 65 are on, the driving electric power is not applied to the LED light source 20, but flows in a closed circuit comprised of the second switching units 35, 45, 55 and 65, the diodes D and the inductors L.

In an exemplary implementation, when the display is on, a constant electric current is stored in the inductors L by the PWM generators 31, 41, 51 and 61 regardless of whether the LED light source 20 is on or off. The electric power may be quickly and stably provided to the LED light source 20 when the LED light source 20 is changed from on to off, since the electric current is stored in the inductors L.

The controller 100 controls the driving power units 30, 40, 50 and 60 so that each electric current of the driving electric powers provided from the plurality of the driving power units 30, 40, 50 and 60 has a phase difference. For example, the controller 100 applies a control signal to the respective PWM generators 31, 41, 51 and 61 in the driving power units 30, 40, 50 and 60 so that the PWM signals output from the PWM generators 31, 41, 51 and 61 may sequentially be retarded by the phase difference. Accordingly, the electric currents output to the LED light source 20 have a phase difference by the sequentially retarded PWM signals. The control signal which the controller 100 applies to the PWM generators 31, 41, 51 and 61 is a synchronizing signal to retard the PWM signals at regular intervals.

A cycle of the synchronizing signal output by the controller 100 is T/4, wherein T represents cycles of the PWM signals output from the respective PWM generators 31, 41, 51 and 61, and the denominator 4 represents the number of the driving power units 30, 40, 50 and 60. The PWM signals output from the PWM generators 31, 41, 51 and 61 may have different cycles and amplitudes. The PWM signals may have the same cycle so that they may be more easily controlled by the synchronizing signal applied from the controller 100 and similar amplitudes to provide a uniform electric power to the LED light source 20.

Figure 2:
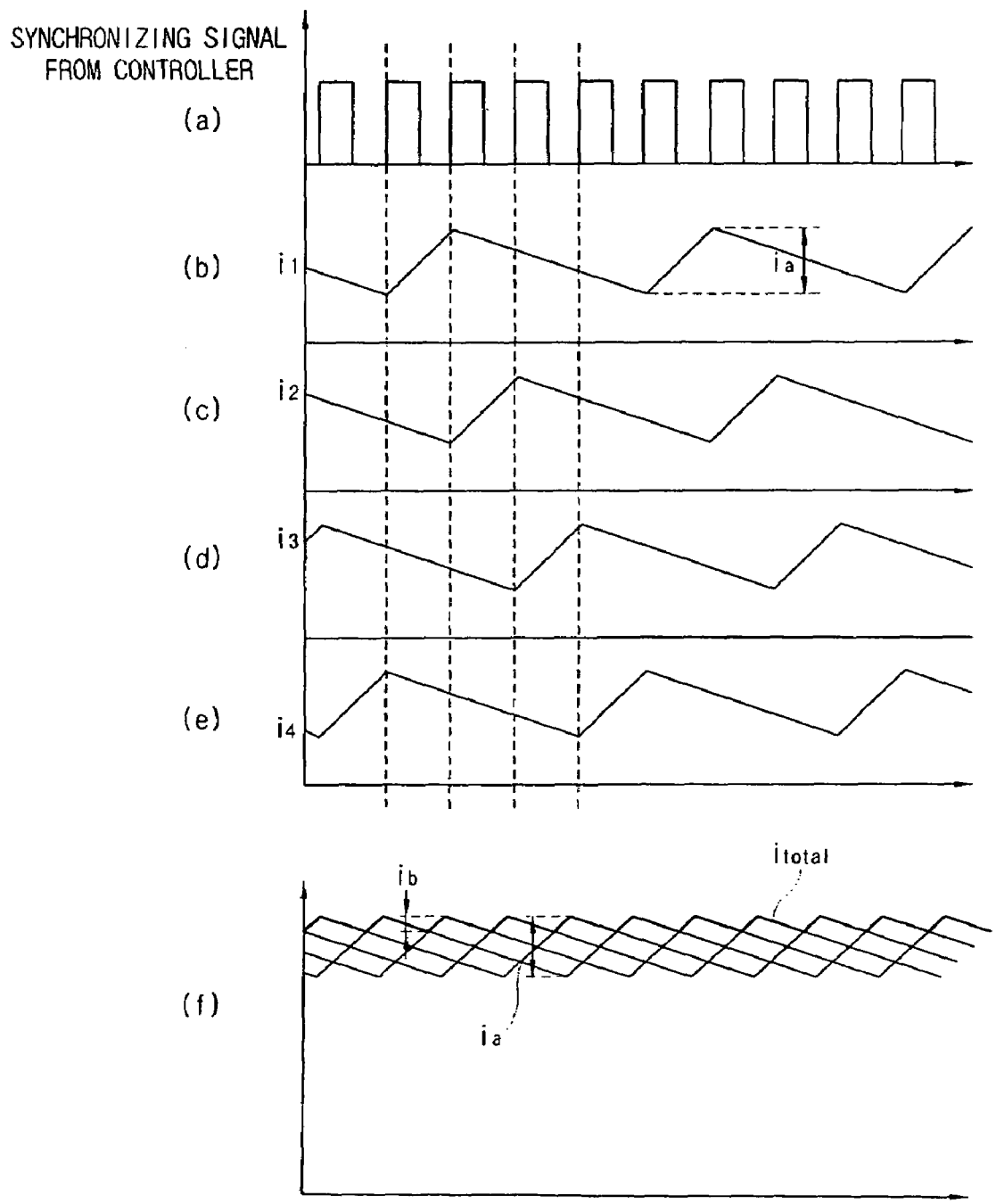
FIG. 2 illustrates a waveform of an output current from a driving power unit in accordance with an exemplary embodiment of the present invention.

FIG. 2 illustrates a waveform of an output current from a driving power unit in accordance with an exemplary embodiment of the present invention.

An electric current output form a first driving power unit 30 has a waveform shown in (b). Likewise, each electric current output from respective second, third and fourth driving power units 40, 50 and 60 has a waveform shown in (c), (d) and (e). These waveforms of the electric currents are similar to waveforms of the PWM signals output from the PWM generators 31, 41, 51 and 61.

The electric currents output from the driving power units 30, 40, 50 and 60 have the same cycle and the same amplitude, and all have a ripple as great as amplitude $i_a$. Further, the electric currents are retarded at a predetermined phase difference. If the PWM signals have the cycle of T and the frequency of f, the phase difference is expressed as the reciprocal of the frequency times 4, such as the number of the driving power units 30, 40, 50 and 60. That is, the phase difference of the electric current output from the driving power units 30, 40, 50 and 60 is expressed as 1/f*4. Here, the greater the number of the driving power units 30, 40, 50 and 60, the more the phase difference decreases. The synchronizing signal output by the controller 100 is shown in (a) of FIG. 2.

From the point of view of the LED light source 20, the electric current input to the LED light source 20, the sum of the electric currents $i_1$ to $i_4$ input from the first driving power unit 30 through the fourth driving power unit 60, corresponds to a total electric current $i_{total}$ shown in (f). Each electric current output from the driving power units 30, 40, 50 and 60 has the ripple of $i_a$, but the LED light source 20 understands that the total electric current $i_{total}$ has a ripple of $i_b$.

Likewise, the ripple of the electric current provided to the LED light source 20 decreases, thereby preventing deterioration of light characteristic which is conventionally generated by the ripple and improving efficiency of the LED light source 20. Ultimately, this improves an image quality in a display.

Figure 3:
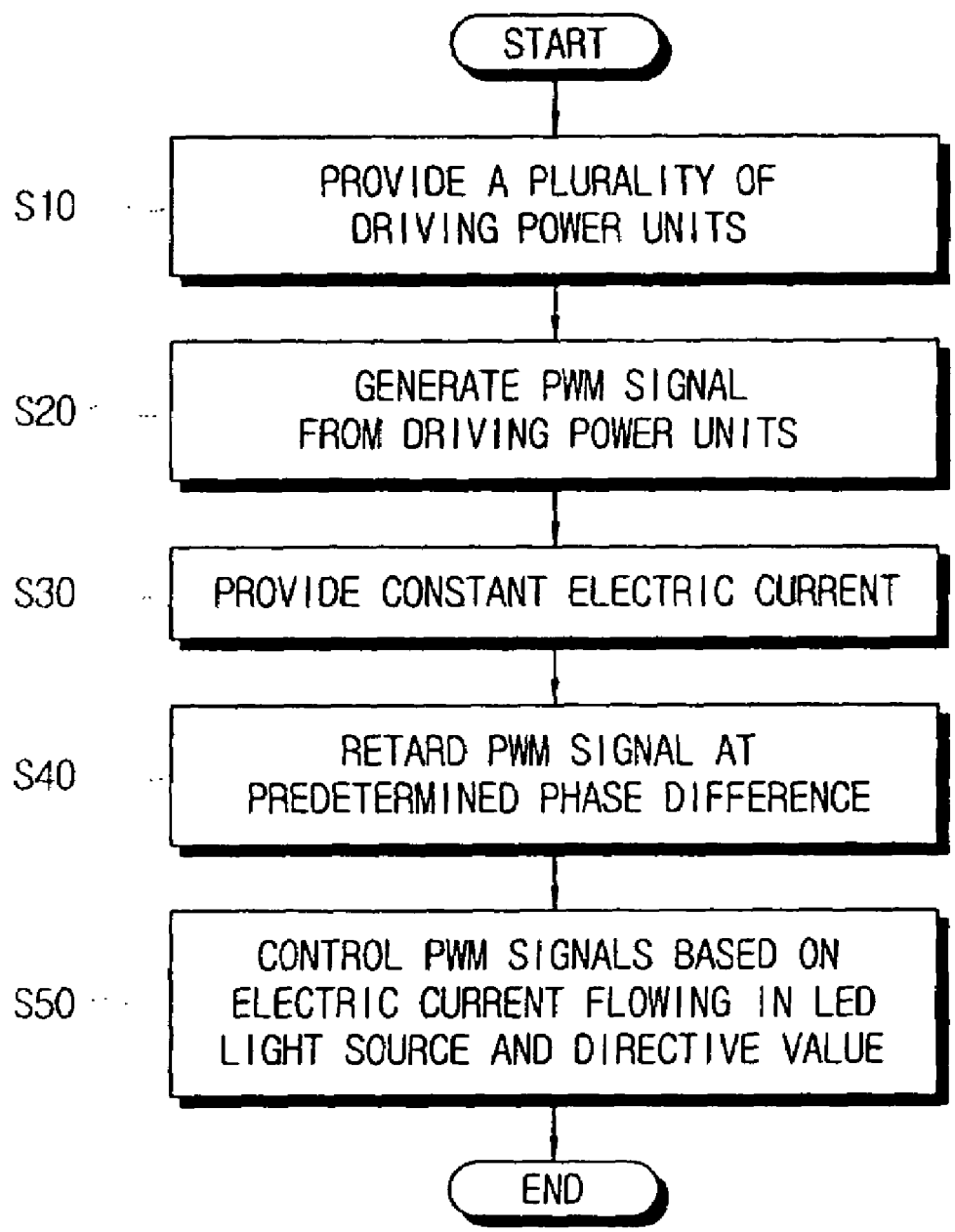
FIG. 3 is a control flow chart of the display apparatus in accordance with an exemplary embodiment of the present invention.

FIG. 3 illustrates a control method of the display apparatus in accordance with an exemplary embodiment of the present invention. First, the plurality of driving power units 30, 40, 50 and 60 are provided to supply electric power to the LED light source 20 (S10). The driving power units 30, 40, 50 and 60 are connected with the constant current source 10 in parallel, but each may comprise an independent constant current source 10.

The driving power units 30, 40, 50 and 60 control the PWM generators 31, 41, 51 and 61 to generate the PWM signals according to the control signal from the controller 100 (S20), thereby providing the constant electric current to the LED light source 20 (S30). The PWM generators 31, 41, 51 and 61, according to an exemplary embodiment of the present invention, compare the directive value with an electric current value output from the LED light source 20 to turn on/off the first switching units 33, 43, 53 and 63 by themselves.

When the constant electric current is provided, the controller 100 applies the synchronizing signal of the control signal to the PWM generators 31, 41, 51 and 61, and then the PWM signals generated by the synchronizing signal from the PWM generators 31, 41, 51 and 61 are sequentially retarded at the phase difference (S40).

The electric currents output to the LED light source 20 have the predetermined phase difference by the sequentially retarded PWM signals and are output to the LED light source 20. Then, the LED light source 20 is input with a single electric current that is the sum of the respective retarded electric currents.

The controller 100 continually outputs the synchronizing signal, and the PWM generators 31, 41, 51 and 61 controls each of the PWM signals based on the electric current flowing in the LED light source 20 and the directive value (S50).

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A display apparatus comprising:
    a light source;
    a plurality of driving power units, which have pulse width modulation (PWM) generators generating a PWM signal, for providing driving electric powers to the light source; and
    a controller for controlling the plurality of the driving power units whereby electric currents of the driving electric powers provided from the respective driving power units comprise a phase difference;
    wherein the phase difference is expressed as 1/f*N, where f corresponds to a frequency of the PWM signal and N corresponds to the number of the driving power units.

2. The display apparatus according to claim 1, wherein at least one of the driving units further comprises:
    switching units for providing electric currents output from a constant current source to the light source;
    wherein the PWM signals control whether the switching units are on or off.

3. The display apparatus according to claim 2, wherein the controller controls the respective PWM generators whereby at least one of the PWM signals are retarded at the phase difference.

4. The display apparatus according to claim 2, wherein the controller outputs a synchronizing signal to the PWM generators whereby the respective PWM signals comprise a phase difference.

5. The display apparatus according to claim 2, wherein an electric current is increasingly provided to the light source when the switching unit is on, and the electric current is decreasingly provided to the light source when the switching unit is off.

6. The display apparatus according to claim 2, wherein the PWM generator detects an electric current flowing in the light source and compares a detected electric current with a directive value, and controls whether the switching unit is on or off based on the comparison.

7. The display apparatus according to claim 6, wherein the PWM generator generates the PWM signal to turn on the switching unit when the detected electric current is greater than the directive value, and to turn off the switching unit when the detected electric current is less than the directive value.

8. The display apparatus according to claim 1, wherein the light source comprises a light-emitting diode.

9. A control method of a display apparatus comprising a light source, the method comprising:
    providing a plurality of driving power units;
    generating pulse width modulation (PWM) signals to provide a constant electric current to the light source; and
    sequentially retarding the PWM signals at a phase difference,
    wherein the phase difference is expressed as 1/f*N, where f corresponds to a frequency of the PWM signal and N corresponds to the number of the driving power units.

10. The control method of the display apparatus according to claim 9, wherein the retarding of the PWM signals generate a synchronizing signal whereby the PWM signals comprise the phase difference.

* * * * *